United States Patent
Van Den Bergen

(10) Patent No.: US 8,637,596 B2
(45) Date of Patent: Jan. 28, 2014

(54) FLAME RETARDANT RADIATION CURABLE COMPOSITIONS

(75) Inventor: Hugues Van Den Bergen, Drogenbos (BE)

(73) Assignee: Cytec Surface Specialties S.A., Brussels (BE)

( * ) Notice: Subject to any disclaimer, the term of this patent is extended or adjusted under 35 U.S.C. 154(b) by 204 days.

(21) Appl. No.: 12/936,634

(22) PCT Filed: Mar. 30, 2009

(86) PCT No.: PCT/EP2009/053719
§ 371 (c)(1),
(2), (4) Date: Oct. 6, 2010

(87) PCT Pub. No.: WO2009/124854
PCT Pub. Date: Oct. 15, 2009

(65) Prior Publication Data
US 2011/0028627 A1    Feb. 3, 2011

(30) Foreign Application Priority Data

Apr. 7, 2008   (EP) .................................... 08006922

(51) Int. Cl.
*A61K 8/81*   (2006.01)
*C08K 5/05*   (2006.01)

(52) U.S. Cl.
USPC .......................................... 524/280; 524/380

(58) Field of Classification Search
USPC ....................................................... 524/280
See application file for complete search history.

(56) References Cited

U.S. PATENT DOCUMENTS

| 3,549,478 | A | 12/1970 | Gillery et al. |
| 6,242,506 | B1 | 6/2001 | Fan et al. |
| 8,211,532 | B2 | 7/2012 | Klossek et al. |
| 2004/0152799 | A1 * | 8/2004 | Miller et al. .................. 522/104 |
| 2005/0209357 | A1 * | 9/2005 | Xu et al. .......................... 522/71 |
| 2005/0282018 | A1 * | 12/2005 | Van Den Bergen et al. .. 428/426 |

FOREIGN PATENT DOCUMENTS

| EP | 0200394 A1 | 5/1986 |
| GB | 2015417 A | 9/1979 |
| GB | 2032844 A | 5/1980 |
| JP | S58-019371 | 2/1983 |
| JP | H10-254132 | 9/1998 |
| WO | 2004035308 A1 | 4/2004 |
| WO | 2004/067599 A1 | 8/2004 |

OTHER PUBLICATIONS

U.S. Appl. No. 13/487,333 which is a divisional of USP 8,211,532.
"The chemistry of free radical polymerization", edited by Graeme Moad and David H.Solomon; Pergamon (1995), pp. 53-95.
Kurt Willard, "Flexible Epoxy Acrylates," The Premier UV/EB, Conference & Exhibition, Indianapolis, IN, United States, Apr. 28-May 1, 2002, 171-181 Publisher: RadTech International North America, Chevy Chase, MD.
International Search Report of PCT/EP2009/053719 mailed May 25, 2009.
Japanese Office Action issued Sep. 30, 2013 in corresponding Japanese Application No. 2011-503400.

* cited by examiner

*Primary Examiner* — Hui Chin
(74) *Attorney, Agent, or Firm* — Wenderoth, Lind & Ponack, L.L.P.

(57) ABSTRACT

The invention relates to a flame retardant composition comprising at least one radiation curable polymer precursor and at least one halogenated flame retardant which is soluble in the composition and their use to make fire resistant glass laminates.

14 Claims, No Drawings

FLAME RETARDANT RADIATION CURABLE COMPOSITIONS

This application is the U.S. National Phase application of International Application No. PCT/EP2009/053719, filed Mar. 30, 2009 and published in English as WO 2009/124854 A1, which claims benefit of priority from European Patent Application No. 08006922.2, filed Apr. 7, 2008, each of which is incorporated by reference herein in its entirety.

The present invention relates to flame retardant radiation curable compositions especially useful for making fire resistant glass laminates.

Standard glass offers little fire protection and will break typically when temperatures over 120° C. are reached. With structural fires capable of reaching extremely high temperatures very quickly, there is a need for fire-resistant glass specialty glass that can survive high temperatures, typically in excess of 900° C. This fire-resistant glass should keep flames and smoke from spreading from one room to another, restricting fire damage to a limited area. Fire-resistant glazing must pass a battery of tests established by national test standards. The ratings of fire resistant glazing are time increments reflecting the length of time the glass should be expected to perform reliably in a fire. The testing is conducted simulating conditions in a burning building. In order to successfully pass the test, the glass must retain in its frame; cracking is allowed provided the glass can still act as a barrier to flames and smoke. In US an additional test, called the hose stream test, demonstrating the ability of the glass to withstand a thermal shock is also required. In this test, the hot glass pane is sprinkled with water at a pressure of at least 30 psi through a fire hose with a high pressure nozzle. In general, only specialty glasses such as ceramic glasses pass this test.

Many of the locations requiring fire resistant glass are also locations where impact safety is required. Fire resistant glasses like ceramic glasses have only very low impact resistance. Up to now, these glasses have been laminated with the aid of a thermoplastic fluorinated films. However, this lamination requires special expensive equipment and does not allow making bent glass.

The technique of laminating glass panes, i.e. bind two or more glass panes together in a permanent way by an interlayer, is well known and generally applied. Such glass laminates are used for automotive and building applications. Laminating protects people for splinters in case of glass breaking and it also allows to improve the impact resistance or sound insulation properties of the glazing. Laminated glass can be produced by liquid cast-in-place resin polymerized in situ. In this technique, two glass panes are bond together by a double-sided adhesive tape that also functions as a distance holder. The thus created cavity between the two sheets is then filled up with a liquid resin. The liquid resin is then polymerized, the so-called "curing", by radiation or chemically by appropriate catalysts and accelerators. After completion of the polymerization a solid interlayer is formed. The chemical nature of the liquid resins used for glass lamination can be of different kinds, either polyester, polyurethane, silicone or acrylic. Nowadays mostly applied are UV resins, initiated by the action of UV light of low intensity. The UV radiation activates the reactive monomers of the system through the photoinitiator and starts the polymerization.

Flame retardant glass laminates have for example been described in WO 2004/035308. The compositions described therein are based on phosphorous containing compositions.

Flame retardant compositions having good flame retardant properties, i.e. said to meet the stringent flammability rating of UL94 V0 have also been described in WO 2005/054330. These flame retardant curable compositions comprise at least two flame retardants belonging to different classes of compounds, especially a combination of brominated flame retardants with aluminum hydroxide and phosphorous containing compounds.

Most of the compositions described in this patent application are not translucent and hence are not suitable for making transparent laminates that can be used in building.

Moreover, it has been discovered that the use of these phosphorous containing compositions do not permit to pass the flame retardant tests.

The present invention aims to solve these problems.

The present invention therefore relates to a radiation curable flame retardant composition comprising (i) at least one polymer precursor and (ii) at least one halogenated flame retardant which is soluble in said composition.

By halogenated flame retardant soluble in said composition is meant a flame retardant additive which when mixed with the rest of the polymer precursor(s) form one single liquid phase which is transparent before curing.

By additive is meant a non-reactive compound, id est a compound that does not co-polymerize (in other words is non copolymerisable). The flame retardant additive of the invention advantageously does not form part of the polymer backbone or oligomer backbone, not before and not after curing.

The halogenated flame retardant is preferably selected from those which have a solubility in n-butylacrylate at 20° C. of at least 10 g/l, more preferably from those which in addition have a solubility in acrylic acid at 20° C. of at least 10 g/l. Preferably the solubility in n-butylacrylate at 20° C. is at least 100 g/l, more preferably at least 200 g/l. Preferably the solubility in acrylic acid at 20° C. is at least 100 g/l, more preferably at least 200 g/l.

By soluble in said composition is meant that the flame retardant additive is soluble per se in the polymer precursors, id est without the need of any solvent.

It is mainly organic flame retardant additives that possess such solubility. The organic additive may be liquid or solid.

The halogenated flame retardant additive is preferably substantially free from phosphorus.

By substantially free is meant that the phosphor (P) content is below 1% by weight (of the flame retardant additive), preferably below 0.5% by weight, especially below 0.1% by weight.

The halogenated flame retardant advantageously is organic. The halogenated flame retardant is preferably a brominated flame retardant, more preferably presenting a bromine content of at least 40% by weight. Particularly preferred are brominated flame retardants having a bromine content of at least 45% by weight, especially at least 60% and most preferably of at least 70% by weight.

Aliphatic halogenated flame retardants are preferred, especially brominated and chlorinated ones. Brominated aliphatic flame retardants are preferred. Most preferred are aliphatic brominated alcohols.

Halogenated alcohols, more in particular brominated alcohols, such as tetrabromophtalate diol, commercialized under the name of RB-79 by Albemarle, and tribromoneopentylalcohol, commercialized under the name of FR-513 by ICL, are suitable.

Tribromoneopentylalcohol is particularly preferred as flame retardant (ii).

The composition according to the invention generally contains from 20 to 80% by weight of halogenated flame retardant, preferably from 30 to 70%, and most preferably from 40 to 60% by weight.

In addition to the halogenated flame retardant (ii) as described here above, the composition may contain other flame retardant additives. The composition preferably does not contain phosphorus containing flame retardant additives.

The flame retardant composition comprises at least one polymer precursor. The term polymer precursor is used to designate a monomer or oligomer or mixtures thereof which have suitable polymerisable functionality, preferably comprising at the chains ends or laterally along the chain, one or more (meth)acryl or vinyl groups.

In the present invention, the term "(meth)acryl" is to be understood as to encompass both acryl and methacryl compounds or derivatives as well as mixtures thereof.

The composition according to the invention generally contains from 20 to 80% by weight of one or more polymer precursor, preferably from 30 to 70%, and most preferably from 40 to 60% by weight.

The radiation curable polymer precursor is generally selected from monomers and oligomers comprising one or more (meth)acryl group. Advantageously the radiation curable polymer precursor of the invention is a non flame retardant polymer precursor. Advantageously the polymer precursor is free from halogen and/or phosphorus groups.

The polymer precursor advantageously contains one or more monomers. The monomers used are generally mono-, di-, tri- and/or tetra-(meth)acrylates. Suitable monomers include (meth)acrylic acid, beta-carboxyethyl acrylate, butyl (meth)acrylate, methyl(meth)acrylate, isobutyl (meth)acrylate, 2-ethylhexyl(meth)acrylate, cyclohexyl (meth)acrylate, n-hexyl (meth)acrylate, isobornyl (meth)acrylate, isooctyl (meth)acrylate, n-lauryl (meth)acrylate, octyl/decyl (meth) acrylate, 2-hydroxyethyl(meth)acrylate, phenoxyethyl (meth)acrylate, nonylphenolethoxylate mono(meth)acrylate, 2-(-2-ethoxyethoxy)ethyl(meth)acrylate, 2-butoxyethyl (meth)acrylate, cardura (meth)acrylate, N-vinyl pyrrolidone, 1,6-hexanediol di(meth)acrylate, pentaerythritoltri(meth) acrylate, trimethylolpropanetri(meth)acrylate, phenylglycidylether(meth)acrylate, and the oxyethylated or/and oxypropylated derivatives thereof. Preferred are mono(meth) acrylates, especially acrylic acid, butylacrylate, methylmethacrylate, 2-ethylhexylacrylate and isobornylacrylate. More preferred are n-butylacrylate, acrylic acid and 2-ethylhexylacrylate.

The total quantity of monomer(s) used as polymer precursor is generally from 0 to 100% by weight relative to the total amount of polymer precursors used in the composition. The quantity of monomer(s) is preferably at least 20% by weight, more preferably at least 30% and most preferably at least 45%, by weight of polymer precursors. The total quantity of monomer(s) does usually not exceed 95% by weight, preferably it does not exceed 85% by weight of the total weight of polymer precursors.

The polymer precursor usually comprises one or more oligomers and optionally one or more monomers. Preferred oligomers used in the composition according to the invention are those having a molecular weight MW of from 1000 to 10000. Preferred are those having a MW of at least 2000, especially those having a MW of at least 4000. Preferred oligomers have a MW of at most 8000, preferably at most 7000, more preferably of at most 6000 as determined by gel permeation chromatography (GPC).

The number average molecular weight (Mn) given above is measured by GPC (in THF on a 3×PLgel 5 μm Mixed-D LS 300×7.5 mm column MW range 162 to 377400 g/mol calibrated with polystyrenes standards, at 40° C., using a Merck-Hitachi apparatus).

Preferred oligomers are selected from urethane (meth) acrylates, polyester (meth)acrylates and epoxy (meth)acrylates, more particularly flexible urethane and epoxy (meth) acrylates having an elongation at break of 10 to 500%, more preferably 50 to 300%. The elongation at break is measured by tensile testing of a radiation-cured thin free-film of the oligomer according to ASTM D 638.

Urethane(meth)acrylates are well known in the art and commercially available products. Suitable urethane (meth) acrylates have for example been described in WO 2004/067599. Examples of a suitable urethane(meth)acrylates are urethane acrylates EBECRYL® 230 and EBECRYL® 270 commercially available from Cytec Surface Specialties.

Epoxy(meth)acrylates, i.e. (meth)acrylate esters of epoxy resins, are also well known in the art. Suitable epoxy (meth) acrylates have for example been described in Technical Conference Proceedings—RadTech 2002: The Premier UV/EB, Conference & Exhibition, Indianapolis, Ind., United States, Apr. 28-May 1, 2002 (2002), 171-181 Publisher: RadTech International North America, Chevy Chase, Md. Examples of a suitable epoxy(meth)acrylate are those commercialized under the names of EBECRYL®3708 and EBECRYL®3302.

Urethane (meth)acrylates, especially aliphatic urethane acrylates are particularly preferred.

The total quantity of oligomer(s) used as polymer precursor in the composition is generally from 0 to 100% by weight relative to the total amount of polymer precursors used in the composition. The total quantity of oligomer(s) is preferably at least 5% by weight, more preferably at least 15% by weight relative to the total amount of polymer precursors used in the composition. The quantity of oligomer(s) preferably does not exceed 80% by weight, more preferably it does not exceed 70% by weight and most preferably it does not exceed 55% by weight, relative to the total amount of polymer precursors used in the composition.

The compositions used in the present invention preferably comprise at least one oligomer and at least one monomer such as described here above as polymer precursor.

The compositions according to the present invention generally comprise a photochemical initiator and/or a chemical initiator. Photochemical initiators (also called photoinitiators) are compounds that can generate radicals by absorption of light, typically UV light. Typical photochemical initiators are described in "The chemistry of free radical polymerization", edited by Graeme Moad and David H. Solomon; Pergamon (1995), pages 84 to 89. Alternatively, the same composition without photoinitiator can be cured by electron beam.

Chemical initiators are typically azo-compounds or peroxides that are decomposed to radicals through the application of heat, light or a redox process. The mechanisms are described in "The chemistry of free radical polymerization", edited by Graeme Moad and David H. Solomon; Pergamon (1995), pages 53-95.

The composition according to the invention typically contains from 0 to 5% by weight of at least one photoinitiator. Preferably, the amount of photoinitiator in the composition is comprised between 0.01 and 3% by weight.

The radiation curable composition according to the present invention can also contain other compounds, such as adhesion promoters, stabilizers, antioxidants and UV-absorbers. The amount of other compounds usually does not exceed 10% by weight. Preferably, the composition comprises from 0.01 to 3% by weight of adhesion promotor, especially those selected from silanes.

Advantageously the composition is substantially free from water or solvents (non copolymerisable liquid solvents).

The radiation curable composition according to the invention is generally prepared by adding the flame retardant (ii) to one or more of the polymer precursor(s), especially to one or more of the monomer(s) or to a mixture of polymer precursors until a single phase solution is obtained. The mixing is generally done at a temperature from 5 to 100° C. Alternatively the flame retardant may be dissolved in part of the polymer precursor(s) and then the rest of the polymer precursor(s) are added to the mixture. Alternatively, the polymer precursor(s) can be added to the flame retardant.

The radiation curable flame retardant composition generally have a viscosity at 25° C. of from 1 to 10000 mPas, preferably of from 10 to 1000 mPas, more preferably from 10 to 250 mPas as measured using a cone and plate viscosimeter.

The radiation curable flame retardant compositions according to the present invention permit to meet the V2 classification, the higher classification V1 and even the V0 classification of the UL-94 test at 1 mm thickness. The compositions permit to produce translucent layers and more preferably transparent layers. The composition according to the invention shows improved flame retardant properties, high impact resistance, acoustic insulation, aging resistance and adhesion on laminates.

The radiation curable compositions according to the invention are therefore suitable for a large number of applications, such as casting resin for glass laminates and more specifically for fire resistant glass laminates, polycarbonate laminates, UV curable adhesives and flame retardant coatings.

The radiation curable compositions according to the invention are particular useful for making laminates, especially glass laminates and more specifically glass laminates based on fire resistant glazing. By glass laminates is understood laminates comprising at least one glass pane. In the present description, the term "glass" is used to designate objects made of glass or of glass appearance. Glass appearance objects such as polycarbonate panels can be used but are less preferred because of their poor behavior in case of fire. The glass objects can be made of ordinary float (soda lime) glass, whether tempered or not, or of special fire resistant glass such as borosilicate glass or ceramic glasses. The laminates also include stone-glass laminates.

The present invention also provides a method of producing a laminate comprising the steps of (i) providing a flame retardant composition as described here above; (ii) place the flame retardant composition between two panes, at least one of which is glass, and (iii) let the composition cure to form the polymer which forms the interlayer between the panes. Preferably at least one of the panes is a ceramic pane. The steps (i), (ii) and (iii) are not necessarily distinct, successive, separated steps. In a preferred embodiment, the curable composition can be placed between the panes, allowed to cure by irradiation under UV-light, so as to form a laminate comprising a cured composition layer ("interlayer") bonding the panes together.

The flame retardant composition is more preferably "cast" in a casting cell comprising two opposed outer plies, spaced apart and separated from one another by a peripheral spacer between them, and cured in the cell. Such techniques are well known and are described in, for example, GB-A-2015417 and GB-A-2032844, and in EP-A-0200394.

Curing of the composition can be done either by radiation or chemically by appropriate catalysts and accelerators. Curing is preferably done by irradiation of the composition, more preferably by UV light, especially by the action of UV light of low intensity. Typically an intensity of 1 to 10, preferably of 1.5 to 2.5, mW/cm$^2$ is used.

Typically, the residence time in the UV oven is from 5 to 60, preferably from 15 to 30 minutes. According to a variant of the invention, multi-sheet laminates, i.e. laminates comprising more than one glass pane and/or more than one other panes may be used. The glass panes used in the present invention may be of the same nature or different. For example float (soda lime) glass/ceramic glass or float (soda lime) glass/borosilicate glass. In these multi-sheets laminates, comprising several laminates bound to each other with an interlayer, each interlayer may be of the same or different composition, flame retardant or not.

It has been observed that a radiation curable composition according to the invention permits to bond the two glass sheets together and to form a glass laminate presenting an advantageous combination of properties desired for fire resistant laminates.

The present invention also relates to glass laminates comprising at least one interlayer obtained from the flame retardant composition according to the invention. The laminates according to the invention present good fire resistance. They also have an improved impact resistance and safety impact performance.

The laminates according to the invention are easy to handle and can be cut on size, especially when based on non tempered glass.

The flame retardant radiation curable composition should be translucent when a translucent product is required i.e. as the interlayer of a fire-resistant laminate to be used as a window. The term "translucent" is used herein to describe products and materials which transmit light so that they are suitable for glazing applications, whether providing clear through vision, i.e. being transparent, colorless or not.

Laminates obtained with the invention advantageously are transparent having haze values of less than 5.0 percent, more preferably less than 3.0 percent as measured by Haze Meter.

A strong technical advantage of the liquid resin system is that the cavity between the two glasses is completely filled up with the liquid resin, the shape or roughness of the glass surfaces is of no importance on the bonding with the resin interlayer.

The present invention is illustrated by the following, non-limiting examples.

Compositions of Examples 1 to 9 and Comparative Examples 10R to 12R have been prepared by mixing the different compounds as described in the Table here below. Unless otherwise specified the amounts of the different compounds is given in g. The properties obtained with these compositions were measured and are reported in the Table here below.

Urethane acrylate is an aliphatic difunctional urethane acrylate with improved flexibility; flame retardant FR-513 is tribromoneopentyl alcohol, a solid brominated flame retardant containing about 73% by weight of bromine, commercialized by ICL. RB-79 is a liquid reactive-bromine-containing diester/ether diol of tetrabromophthalic anhydride flame retardant containing about 45% by weight of bromine. NCENDX P30 is a proprietary phosphorus based flame retardant from Albemarle containing 8.9 wt % P.

Other brominated flame retardants such as bromine epoxy polymer sold as F3100 by ICL, ethylene bistetrabromophtalimide sold as BT93 by Albemarle, hexabromocyclodecane sold as FR-1206 by ICL, bis(2,3)-dibromopropylether sold as FR-720 by ICL, tris(tribromoneopenthyl)phosphate sold as FR-370 by ICL, dibromoneopenthylglycol sold as FR-522 by ICL and 2,4,6-tris(2,4,6-tribromophenoxy)1,3,5-triazine sold as SR-245 by ICL have been tested. They are not soluble in n-butylacrylate and acrylic acid in the conditions described above and did not permit to obtain transparent laminates.

Glass laminates were made by bounding two soda lime (float) glass panes of 30×30 cm, 4 mm nominal thickness together with double-sided tape of 1 mm thickness. The composition as described in the aforementioned table was introduced in the interspace using a funnel. Curing was done in a conventional UV oven, intensity measured on the interlayer was 1.5-2.5 mW/cm$^2$. Curing time was 20-25 minutes.

here above. After curing, the specimens were cut on size, the silicon release paper and the polyester films were removed.

Safety performance was assessed by an impact test similar to NBN S23-002(=STS38), dropping a steel ball of 2.2 kg from a height of 1.5 m onto the 30 cm×30 cm soda lime glass laminates as described above. The test was repeated until the steel ball passed through the laminate. The impact number is defined as the maximal number of impacts the laminate was able to resist before the steel ball passed through it.

|  | Example | | | | | |
|---|---|---|---|---|---|---|
|  | 1 | 2 | 3 | 4 | 5 | 6 |
| n-butylacrylate | 5 | 10 | 6 | 11 | 12 | 10 |
| Acrylic Acid | 22 | 19 | 25 | 20 | 20 | 17 |
| Urethane acrylate | 16 | 14 | 19 | 19 | 12 | 17 |
| Flame retardant | FR-513 | FR-513 | FR-513 | FR-513 | RB79 + FR513 | RB79 + FR513 |
| Quantity | 57 | 57 | 50 | 49 | 15 + 41 | 15 + 41 |
| photoinitiator | 0.3 | 0.3 | 0.2 | 0.2 | 0.2 | 0.2 |
| Silane additive | 2 | 2 | 2 | 2 | 2 | 2 |
| Aspect of the composition | Solution/ transparent homogen | Solution/ transparent homogen | Solution/ transparent homogen | Solution/ transparent homogen | Solution/ transparent homogen | Solution/ transparent homogen |
| Viscosity 25° C. | 137 | 80 | 144 | 140 | 79 | 191 |
| Aspect of glass laminate | transparent | transparent | Transparent | transparent | transparent | transparent |
| UL 94 vertical on free film (1 mm thickness) | V0 | V0 | V0 | V0 | V0 | V0 |
| Impact test |  | 6 | 3 | 5 | 4 | 8 |

|  | Example | | | | | |
|---|---|---|---|---|---|---|
|  | 7 | 8 | 9 | 10R | 11R | 12R |
| n-butylacrylate | 5 | 10 | 20 | 40 | 30(1) | 15 |
| Acrylic Acid | 22 | 22 | 20 | 15 |  | 15 |
| Urethane acrylate | 10 | 12 | 10 | 10 | 30 | 10 |
| Flame retardant | RB79 + FR513 | RB79 + FR513 | RB-79 | Ncendx P-30 | Ncendx P-30 | Ncendx P-30 |
| Quantity | 13 + 50 | 13 + 41 | 50 | 35 | 40 | 60 |
| photoinitiator | 0.2 | 0.2 | 0.2 | 0.3 | 0.2 | 0.2 |
| Silane additive | 2 | 2 | 2 | 2 | 2 | 2 |
| Aspect of the composition | Solution/ transparent homogen | Solution/ transparent homogen | Solution/ transparent homogen | Solution/ transparent homogen | Solution/ transparent homogen | Slight phase separation/ not homogenous |
| Viscosity 25° C. | 88 | 21 | 59 | 10 | 133 | 114 |
| Aspect of glass laminate | transparent | transparent | transparent | transparent | transparent | Opaque |
| UL 94 vertical on free film (1 mm thickness) | V0 | V0 |  | Not class[2] | Not class[2] | Not class[2] |
| Impact test | 4 | 1 |  |  | 5 |  |

(1)methylmethacrylate in stead of n-butylacrylate
[2]not classified - not self extinguishing The so-called UL-94 test is a standard test for measuring flammability and has been described in Underwriters Laboratories UL94, Test for flammability of Plastic Materials –UL94, Jul. 29, 1997, the disclosure of which is hereby incorporated herein by reference. In this test, the materials are classified as V0, V1 or V2 depending on the flame retardant performance.

UL94 specimens for 127 mm×12.7 mm Vertical Burning Test were prepared with a thickness of 1 mm. Free films were prepared by pouring the composition onto a silicone release paper using a 1 mm thickness tape to hold the liquid. The liquid was covered by a polyester film and cured as described As can be seen from the examples here above, the compositions according to the invention permit to obtain transparent, impact resistant laminates satisfying the flame retardant tests. Similar results have been obtained with laminates made out of other types of glasses such as commercially available fire resistant glasses like borosilicate and ceramic glasses.

The invention claimed is:

1. A radiation curable flame retardant composition comprising
   (i) at least one polymer precursor comprising one or more oligomers having one or more (meth)acryl or vinyl groups, and (ii) at least one aliphatic halogenated flame retardant additive which is soluble in said composition and which has a solubility in n-butylacrylate at 20° C. of at least 10 g/l, wherein aliphatic halogenated flame retardant additives in the composition are present in a total amount of from 20 to 80% by weight, and wherein at least one of the aliphatic halogenated flame retardant additives is a brominated flame retardant having a bromine content of at least 40% by weight.

2. The radiation curable composition according to claim 1, wherein the one or more oligomers are selected from the group consisting of urethane (meth)acrylates, polyester (meth)acrylates and epoxy (meth)acrylates.

3. The radiation curable composition according to claim 1, wherein the at least one aliphatic halogenated flame retardant additive is further characterized by having a solubility in acrylic acid at 20° C. of at least 10 g/l.

4. The radiation curable composition according to claim 1, wherein the at least one aliphatic halogenated flame retardant additive is a halogenated alcohol.

5. The radiation curable composition according to claim 1, wherein all of the aliphatic halogenated flame retardant additives in the composition are brominated flame retardants having a bromine content of at least 40% by weight.

6. The radiation curable composition according to claim 5, wherein the brominated flame retardant is tribromoneopentyl alcohol.

7. The radiation curable composition according to claim 1 comprising (i) at least one polymer precursor comprising (ia) one or more oligomers having one or more (meth)acryl groups and/or (ib) one or more monomers having one or more (meth)acryl groups, wherein the total amount of the polymer precursors in the composition is from 20 to 80% by weight.

8. The radiation curable composition according to claim 7, wherein the at least one polymer precursor comprises at least 20% by weight of one or more (meth)acrylated monomers selected from the group consisting of mono-, di-, tri- and tetra-(meth)acrylates.

9. The radiation curable composition according to claim 7, wherein the at least one polymer precursor comprises at least 5% by weight of one or more oligomers selected from the group consisting of urethane(meth)acrylates, polyester (meth)acrylates and epoxy (meth)acrylates.

10. The radiation curable composition according to claim 9, wherein the oligomer is selected from the group consisting of urethane (meth)acrylates and epoxy (meth)acrylates, and wherein the oligomer has an elongation break of 10 to 500%.

11. The radiation curable composition according to claim 9, wherein the oligomer is an aliphatic urethane acrylate having a molecular weight of 1000 to 10000.

12. The radiation curable composition according to claim 1, wherein no phosphorus containing flame retardant additives are present.

13. The radiation curable composition according to claim 1, wherein aliphatic halogenated flame retardant additives in the composition are present in a total amount of from 30 to 70% by weight.

14. The radiation curable composition according to claim 1, wherein the composition contains the at least one aliphatic halogenated flame retardant additive and at least one aromatic halogenated flame retardant additive.

* * * * *